United States Patent
Stricker-Shaver et al.

(10) Patent No.: US 12,287,433 B2
(45) Date of Patent: Apr. 29, 2025

(54) METHOD FOR DETERMINING A DISTANCE OF AN OBJECT WITH THE AID OF AN OPTICAL DETECTION APPARATUS AND OPTICAL DETECTION APPARATUS

(71) Applicant: Valeo Schalter und Sensoren GmbH, Bietigheim-Bissingen (DE)

(72) Inventors: Daniel Stricker-Shaver, Bietigheim-Bissingen (DE); Jochen Schenk, Bietigheim-Bissingen (DE); Frank Selbmann, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 1039 days.

(21) Appl. No.: 17/287,769

(22) PCT Filed: Oct. 15, 2019

(86) PCT No.: PCT/EP2019/077933
§ 371 (c)(1),
(2) Date: Apr. 22, 2021

(87) PCT Pub. No.: WO2020/083709
PCT Pub. Date: Apr. 30, 2020

(65) Prior Publication Data
US 2021/0396858 A1  Dec. 23, 2021

(30) Foreign Application Priority Data
Oct. 25, 2018  (DE) ..................... 10 2018 126 631.6

(51) Int. Cl.
*G01S 7/48* (2006.01)
*G01S 7/4865* (2020.01)
(Continued)

(52) U.S. Cl.
CPC ............ *G01S 7/4865* (2013.01); *G01S 17/10* (2013.01); *G01S 17/931* (2020.01)

(58) Field of Classification Search
USPC ....................................... 356/5.01
See application file for complete search history.

(56) References Cited

U.S. PATENT DOCUMENTS 7,218,385 B2 * 5/2007 Takagi .................. G01S 17/931
356/4.02
10,215,696 B2 * 2/2019 Zimdars ................. G01N 21/86
(Continued)

FOREIGN PATENT DOCUMENTS

DE  4108376 A1  12/1992
DE  10153742 A1  5/2003
(Continued)

OTHER PUBLICATIONS

International Search Report and Written Opinion in corresponding International Application No. PCT/EP2019/077933, mailed Jan. 28, 2020 (12 pages).
(Continued)

*Primary Examiner* — James R Hulka
(74) *Attorney, Agent, or Firm* — Osha Bergman Watanabe & Burton LLP

(57) ABSTRACT

A method for determining a distance of an object with the aid of an optical detection apparatus and such an apparatus are described. A light signal pulse is emitted and reflected at the object, and is received as an echo light signal pulse. The echo light signal pulse is divided upon reception into temporally successive discrete reception time windows and converted into corresponding electrical energy. The end of the respective conversion is in each case assigned as the sampling time to the corresponding time window. The electrical energies of the time windows are compared in each case with a threshold value. As soon as the electrical energy (Continued)

of a first reference reception time window is greater than the threshold value, a linear interpolation of the temporal profile of the discrete electrical reception signal is carried out temporally before the sampling time of the first reference time window.

11 Claims, 3 Drawing Sheets

(51) Int. Cl.
    *G01S 17/10* (2020.01)
    *G01S 17/931* (2020.01)

(56) References Cited

U.S. PATENT DOCUMENTS

| | | |
|---|---|---|
| 2005/0243301 A1 | 11/2005 | Takagi |
| 2012/0257186 A1* | 10/2012 | Rieger .................... G01S 17/18 356/5.01 |
| 2017/0023469 A1* | 1/2017 | Zimdars ............. G01N 21/3586 |
| 2018/0356502 A1* | 12/2018 | Hinderling ............ G01S 7/4818 |
| 2019/0250257 A1* | 8/2019 | Finkelstein ........... G01S 17/931 |
| 2020/0057146 A1* | 2/2020 | Steinkogler ........... G01S 7/4816 |
| 2020/0249358 A1* | 8/2020 | Matsuda ................. G01S 7/497 |

FOREIGN PATENT DOCUMENTS

| | | |
|---|---|---|
| EP | 1291673 A2 | 3/2003 |
| EP | 2182378 B1 | 7/2012 |
| EP | 2315045 B1 | 8/2012 |

OTHER PUBLICATIONS

German Search Report in corresponding German Application No. 10 2018 126 631.6, dated May 23, 2019 (15 pages).

* cited by examiner

METHOD FOR DETERMINING A DISTANCE OF AN OBJECT WITH THE AID OF AN OPTICAL DETECTION APPARATUS AND OPTICAL DETECTION APPARATUS

TECHNICAL FIELD

The invention relates to a method for determining a distance of an object with the aid of an optical detection apparatus, in which
at least one light signal pulse is emitted,
at least one light signal pulse reflected at the object is received as an echo light signal pulse, is converted into at least one electrical reception signal, and the at least one electrical reception signal is registered,
a total time between the emission of the at least one light signal pulse and the registering of the at least one electrical reception signal is determined,
a signal time of flight between the emission of the at least one light signal pulse and the reception of the at least one echo light signal pulse is ascertained as a difference between the total time and at least one correction time, wherein, with the at least one correction time, the time that is required for converting the at least one echo light signal pulse into the at least one electrical reception signal and for registering the at least one electrical reception signal is taken into account,
the signal time of flight is used as a measure of the distance of the object from the detection apparatus.

The invention furthermore relates to an optical detection apparatus for determining a distance of an object,
having at least one transmitter for transmitting at least one light signal pulse,
having at least one receiver for receiving at least one light signal pulse reflected at the object as an echo light signal pulse, for converting the at least one echo light signal pulse into at least one electrical reception signal and for registering the at least one electrical reception signal,
having at least one control and evaluation device, having means
for controlling the at least one transmitter and the at least one receiver,
for determining a total time of flight between the emission of the at least one light signal pulse and the registering of the at least one electrical reception signal,
for ascertaining a signal time of flight between the emission of the at least one light signal pulse and the reception of the at least one echo light signal pulse as a difference between the total time and at least one correction time, wherein, with the at least one correction time, the time that is required for converting the at least one echo light signal pulse into the at least one electrical reception signal and for registering the at least one electrical reception signal is taken into account,
wherein the signal time of flight can be used as a measure of the distance of the object from the detection apparatus.

PRIOR ART

EP 2 315 045 B1 discloses a method for measuring distances or distance changes according to the signal time-of-flight principle. Within a respective measurement period, an electromagnetic signal is emitted at a prescribable transmission time point and the signal received in a monitoring region after remission is sampled. A histogram of such received signals is accumulated over a multiplicity of measurement periods, and the reception time and thus the time of flight are determined from the histogram by way of interpolation and thus with a better temporal resolution than that of the histogram. The transmission time points are prescribed over the multiplicity of measurement periods in accordance with a distribution such that the temporal position of the reception time within the histogram varies over the multiplicity of measurement periods, so that the reception time comes to lie in various bins of the histogram in a targeted manner. The width of the distribution is a multiple of the temporal resolution of the histogram, and the distribution of the transmission time points is realized with a higher resolution than that of the histogram.

The invention is based on the object of creating a method and an optical detection apparatus of the type mentioned in the introductory part, in which the signal time of flight and thus the distance of the object can be determined more accurately.

DISCLOSURE OF THE INVENTION

This object is achieved with the method according to the invention in that
the at least one received echo light signal pulse is divided upon reception into temporally successive discrete reception time windows having a temporal length that corresponds to a prescribed cycle time, and the respective energy of the at least one echo light signal pulse in the corresponding reception time windows is converted into corresponding electrical energy, wherein the end of the respective conversion is assigned in each case as the sampling time to the corresponding reception time window and the discrete temporal profile of the electrical energy of the mutually successive reception time windows forms the temporal profile of a discrete electrical reception signal,
the electrical energies of the reception time windows are compared in each case with a prescribed or prescribable threshold value,
as soon as the electrical energy of a reception time window, which is referred to as a first reference reception time window, is greater than the threshold value, a linear interpolation of the temporal profile of the discrete electrical reception signal is carried out temporally before the sampling time of the first reference reception time window, starting from the electrical energy of the first reference reception time window at the sampling time thereof and the electrical energy during the sampling time of the temporally preceding reception time window, which is referred to as a second reference reception time window,
a first reception time, in which the electrical energy according to the linearly interpolated section of the discrete electrical reception signal reaches the threshold value, is ascertained,
a first correction time is ascertained from the difference between the sampling time of the first reference reception time window and the first reception time,
a second correction time is ascertained from a correction function for the first correction time, wherein the correction function takes into account a temporal profile of a corresponding temporally continuous electrical reception signal, and the signal time of flight is ascertained from the difference between the sampling time of the first reference reception time window and the second correction time.

In the invention, the received echo light signal pulse, which has a continuous temporal profile, is according to the invention converted initially into electrical energy in discrete sections. This can be advantageous for technical reasons. Owing to the correction function, the reception time is corrected with respect to the continuous profile of the received echo light signal pulse. In this way, the reception time and thus the signal time of flight can be determined more accurately.

In the invention, the energy of the at least one echo light signal pulse, which has a continuous temporal intensity distribution, is converted into electrical energy in particular in the form of charge carriers. This can be accomplished in particular with a charge-coupled semiconductor component, in particular a charge-coupled device (CCD). In this case, the electrical energy is accumulated according to the temporal profile of the at least one echo light signal pulse in temporally successive reception time windows, which can be referred to as "buckets." Each reception time window here contains the electrical energy that corresponds to the energy of the at least one echo light signal pulse minus corresponding conversion losses in the time period of the respective reception time window. The temporal length of the reception time windows corresponds to a prescribed cycle time, in which the change between the reception time windows also takes place. The respective temporal end of a reception time window is referred to as the sampling time thereof. The at least one echo light signal pulse having a continuous energy profile is thus initially converted into an electrical reception signal with a discrete energy profile, which will be referred to below as a discrete electrical reception signal.

At the end of each reception time window, the electrical energy contained therein is compared with a prescribed or prescribable threshold value. If the electrical energy is greater than the threshold value, the corresponding reception time window is used as the first reference reception time window. The reception time window that temporally precedes the first reference reception time window is used as the second reference reception time window. A linear interpolation of the temporal profile of the discrete electrical reception signal is performed between the first reference reception time window and the second reference reception time window. The reference reception time windows are here characterized in each case by the corresponding electrical energy and their respective sampling time. The electrical energies at the corresponding sampling times are thus used to carry out the linear interpolation.

The time point of the linearly interpolated section of the curve profile of the discrete electrical reception signal in which the electrical energy corresponds to the threshold value is ascertained as a first reception time. The first reception time forms a first approximation of the actual reception time.

Next, a first correction time is ascertained from the difference between the sampling time of the first reference reception time window and the first reception time.

A second correction time is determined for the first correction time with the aid of a correction function. The correction function takes into account a temporal profile of a corresponding continuous electrical reception signal. It is assumed for the continuous electrical reception signal that the energy of the at least one received echo light signal pulse is converted into electrical energy and registered continuously.

The signal time of flight is ascertained from the difference between the sampling time of the first reference reception time window and the second correction time. The signal time of flight can be used as a measure of the distance in particular for further processing with a driver assistance system. Alternatively or additionally, the distance of the object can be ascertained, in particular calculated, from the signal time of flight.

Advantageously, the optical detection apparatus can operate in accordance with a light pulse time-of-flight method. Optical detection apparatuses operating in accordance with the light pulse time-of-flight method can be embodied and referred to as time-of-flight systems (TOF), light detection and ranging systems (LiDAR), laser detection and ranging systems (LaDAR) or the like. Here, a time of flight from transmission of a light signal pulse using at least one transmitter and receipt of the corresponding reflected light signal pulse using at least one receiver is measured, and a distance between the detection apparatus and the detected object is ascertained therefrom.

Advantageously, the optical detection apparatus can be designed as a scanning system. In this context, a monitoring region can be sampled, that is to say, scanned, with light signal pulses. For this purpose, the corresponding light signal pulses can be panned over the monitoring region with respect to their transmission direction. In this case, at least one deflection device, in particular a scanning device, a deflection mirror device or the like, can be used.

Advantageously, the optical detection apparatus can be designed as a laser-based distance measurement system. The laser-based distance measurement system can have, as the light source of a transmitter, at least one laser, in particular a diode laser. The at least one laser can be used to transmit in particular pulsed light signals. The laser can be used to emit light signal pulses in frequency ranges that are visible or not visible to the human eye. Accordingly, at least one receiver can have a detector designed for the frequency of the transmitted light signal pulses, in particular an (avalanche) photodiode, a diode array, a CCD array or the like. The laser-based distance measurement system can advantageously be a laser scanner. A laser scanner can be used to sample a monitoring region with light signal pulses.

The invention can be used in a vehicle, in particular a motor vehicle. The invention can advantageously be used in a land-based vehicle, in particular a passenger vehicle, a truck, a bus, a motorcycle or the like, an aircraft and/or a watercraft. The invention can also be used in vehicles that can be operated autonomously or at least partially autonomously.

The optical detection apparatus can advantageously be connected to at least one electronic control apparatus of the vehicle, in particular a driver assistance system and/or a chassis control system and/or a driver information device and/or a parking assistance system or the like or can be part of such an apparatus, system or device.

In an advantageous configuration of the method, the correction function can be ascertained from reference measurements. In this way, the correction function can be adapted to the detection apparatus used.

Advantageously, the correction function can be determined from measurements of the correction times at different distances of objects. In this way, a correlation between the signal time of flight and the necessary correction times during the continuous profile of the at least one optical light signal pulse and accordingly the at least one electrical reception signal can be ascertained.

In a further advantageous configuration of the method, the correction function can be ascertained initially. In this way, the correction function can be ascertained individually after the production of the detection apparatus.

Advantageously, the correction function can be prescribed, in particular stored and/or programmed, in a control and evaluation device. In this way, the correction function can be more quickly retrieved.

In a further advantageous configuration of the method, the correction function can be $$\text{t\_korr2} = \text{f\_t\_korr1}(x) = T \frac{\int_0^{t\_korr1} p(x)dx}{\int_0^T p(x)dx},$$

wherein T is the respective length of the reception time window, t_korr1 is the first correction time, t_korr2 is the second correction time, p(x) is the frequency of the occurrence of events with the first correction time t_korr1 within a reception time window for a multiplicity of reference measurements with different signal times of flight. In this way, the frequency of the occurrence of events up to the first correction time can be weighted with respect to the occurrence of events in the entire reception time window. In this way, the continuous temporal profile of the electrical reception signal can be taken into account.

In a further advantageous configuration of the method, the distance of the object from the detection apparatus can be ascertained from the signal time of flight. In this way, the position of the object relative to the detection apparatus can be determined from the distance.

Advantageously, the distance of the object can be calculated from the signal time of flight.

In a further advantageous configuration of the method, it is possible to ascertain and/or prescribe respective correction functions for light signal pulses and/or electrical reception signals with different amplitudes. In this way, variations in the temporal profiles of the at least one light signal pulse and/or of the electrical reception signal can be taken into account. Such variations can of different amplitudes of the at least one light signal pulse and/or of the electrical reception signal be caused.

In a further advantageous configuration of the method, the at least one reflected light signal pulse can be received with at least one charge-coupled semiconductor component and be converted into at least one electrical reception signal. Using a charge-coupled semiconductor component, it is possible for photons of the at least one reflected light signal pulse to be converted into corresponding charge carriers, in particular electrons. The electrons can be accumulated electrically, and the corresponding electrical energy can be determined therefrom.

The charge-coupled semiconductor component can advantageously be a charge-coupled device (CCD). The CCD can advantageously have a two-dimensional design. Some of the pixels of the two-dimensional CCD can advantageously be activated for receiving the light signal pulse and for conversion into electric charge carriers. The respective reception time window can be realized by the relevant pixels being activated for the duration of the cycle time. After completion of the cycle time, the content of the pixels that are activated for reception and for conversion is further transported to adjacent pixels, which are not activated for reception. The non-activated pixels can serve for buffering and for transporting the electric charge carriers.

In a further advantageous configuration of the method, the signal time of flight and possibly the distance can be ascertained using an electrical control and evaluation device. In this way, the signal time of flight and possibly the distance can be determined using soft-ware technology with the aid of the correction function.

The control and evaluation device can be what is known as an FPGA (field programmable gate array). The corresponding correction function can be programmed and/or stored in an FPGA.

Furthermore, the object in the case of the detection device is achieved according to the invention by way of the control and evaluation device having means for carrying out a method according to the invention.

In an advantageous embodiment, the receiver can have at least one charge-coupled semiconductor component. The at least one reflected light signal pulse can be converted into at least one electrical reception signal using a charge-coupled semiconductor component.

The charge-coupled semiconductor component can advantageously be a charge-coupled device (CCD).

In a further advantageous embodiment, the control and evaluation device can have means for determining from the signal time of flight a distance of the object from the detection apparatus. In this way, the position of the object can be determined.

Moreover, the features and advantages indicated in connection with the method according to the invention and the detection apparatus according to the invention and the respective advantageous configurations thereof apply in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which an exemplary embodiment of the invention will be explained in more detail with reference to the drawing. A person skilled in the art will also expediently con-sider individually the features which have been disclosed in the drawing, the description and the claims in combination, and combine them to form further meaningful combinations. In the drawing:

In the figures, identical components are provided with the same reference numerals.

EMBODIMENT(S) OF THE INVENTION

Figure 1:
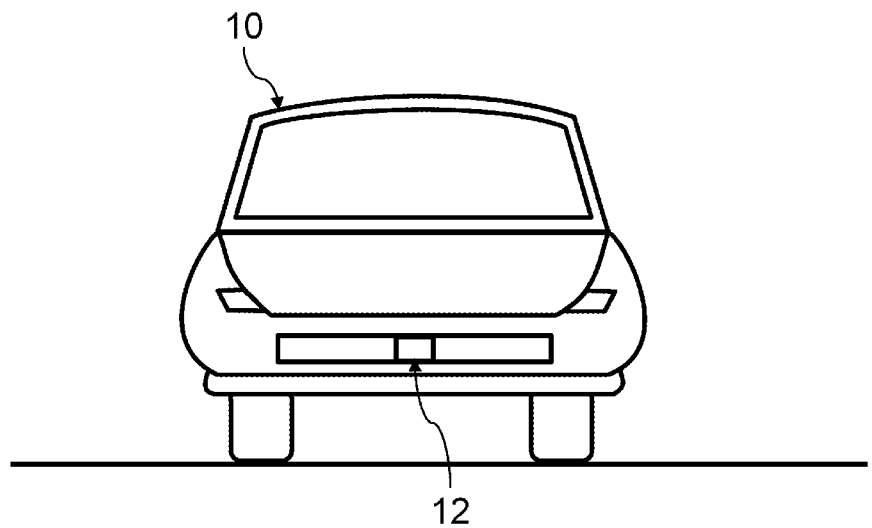
FIG. 1 shows a front view of a vehicle having a laser scanner for monitoring a monitoring region ahead of the vehicle in the direction of travel.

FIG. 1 illustrates a vehicle 10 by way of example in the form of a passenger vehicle in the front view. The vehicle 10 comprises a sampling optical detection apparatus by way of example in the form of a laser scanner 12. The laser scanner 12 is arranged by way of example in the front bumper of the vehicle 10. The laser scanner 12 can also be arranged at another location of the vehicle 10.

Figure 2:
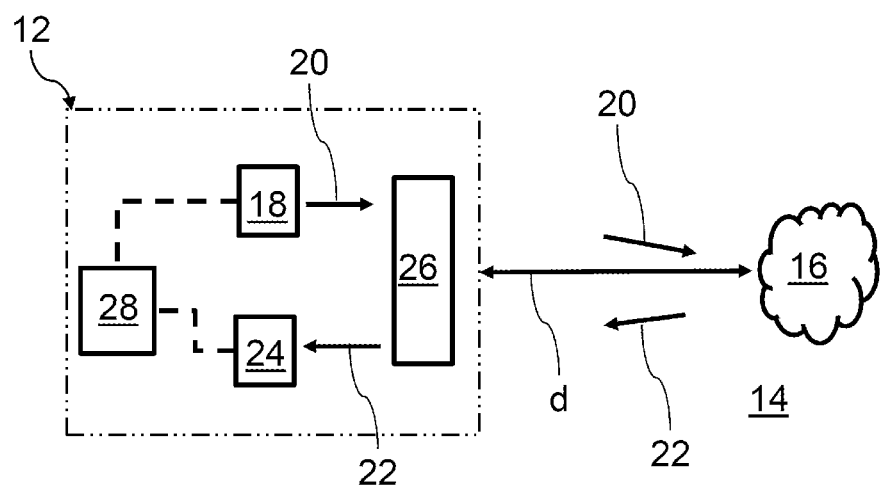
FIG. 2 shows the laser scanner from FIG. 1, having a transmitter, a receiver, a deflection mirror device, and a control and evaluation device.

The laser scanner 12 can be used to monitor a monitoring region, which is referred to as monitoring region 14 in FIG. 2, for objects 16 by way of example ahead of the vehicle 10 in the direction of travel. To this end, a transmitter 18 of the laser scanner 12 can be used to sample the monitoring region 14 with corresponding light signal pulses 20 in the form of laser pulses. If an object 16 is present, the light signal pulses 20 are at least partially reflected at the object 16 and sent back to the laser scanner 12 in the form of echo light signal pulses 22. The echo light signal pulses 22 are received with a corresponding receiver 24 of the laser scanner 12.

The objects 16 can be, for example, other vehicles, persons, animals, road markings, traffic signs, obstacles, potholes or the like.

The laser scanner 12 operates according to what is referred to as a light time-of-flight method, in which a time of flight between the emission of a light signal 20 and the reception of the corresponding echo light signal pulse 22 can be captured, and a distance d, a speed and/or a direction of the object 16 relative to the vehicle 10 can be determined therefrom.

The laser scanner 12 includes the transmitter 18 for emitting the light signal pulses 20, the receiver 24 for receiving the echo light signal pulses 22, a deflection mirror device 26 for deflecting the light signal pulses 20 and the echo light signal pulses 22, and a control and evaluation device 28 for controlling the transmitter 18, the receiver 24, and the deflection mirror device 26 and for evaluating electrical reception signals 30, which are generated using the receiver 24 from the echo light signal pulses 22. The beam directions of the light signal pulses 20 in the monitoring region 14 are panned with the deflection mirror device 26 such that the monitoring region can be sampled with the light signal pulses 20. The echo light signal pulses 22 at objects 16 are directed onto the receiver 24 using the deflection mirror device 26.

The transmitter 18 has a laser for example in the form of a laser diode, with which light signal pulses 20 having a length of, for example, approximately 8 ns can be generated. The transmitter 18 emits, for example, light signal pulses 20 in a range that is not visible to the human eye.

The transmitter 18 is controlled for emitting the light signal pulses 20 using the control and evaluation device 28.

The receiver 24 comprises a sensor for example in the form of a CCD array, which is known per se. The sensor has a multiplicity of reception regions, which are known as the pixels of the CCD array. The reception regions are arranged two-dimensionally in two directions. The area that is defined by the reception regions extends transversely, or perpendicularly, to a reception direction from which the echo light signal pulses 22 strike the receiver 24. The reception regions can be activated separately from one another in a manner such that only the reception regions onto which the echo light signal pulses 22 are directed using the deflection mirror device 26 are activated.

In the active reception regions, the photons of the corresponding echo light signal pulse 22 are converted into electrical energy in the form of electric charge carriers, for example electrons, and collected in a manner which is of no further interest here. The charge carriers, or the number of the charge carriers, form the electrical reception signals 30, which characterize the echo light signal pulse 22. The electrical energy is shifted in a timed manner from the active reception regions in a shift direction into the respectively adjacent, non-active reception regions with a cycle time T. In a last shift cycle, the electrical energy is finally shifted into a read stage. The temporal profile of the electrical reception signals 30 is ascertained with the read stage.

The operation of the laser scanner 12 will be explained in more detail below with reference to FIGS. 2 to 5.

To determine the distance d, a light signal pulse 20 is emitted using the transmitter 18. This light signal pulse 20 is shown in the upper diagram in FIG. 3. The light signal pulse 20 has a duration of approximately 6 ns, for example. The light signal pulse 20 has a continuous temporal profile.

The light signal pulse 20 is directed fixedly at the deflection mirror device 26 using the transmitter 18. The deflection mirror device 26 is used to prescribe the beam direction of the light signal pulse 20 (in a manner which is of no further interest here) in the monitoring region 14. The beam directions of mutually successive light signal pulses 20 or mutually successive groups of light signal pulses 20 can be panned with respect to one another using the deflection mirror device 26 so as to sample the monitoring region 14.

The light signal pulse 20 that has been deflected using the deflection mirror device 26 is reflected by the object 16 in the exemplary embodiment shown and sent back to the laser scanner 12 in the form of an echo light signal pulse 22. The echo light signal pulse 22 is here directed onto the receiver 24 using the deflection mirror device 26.

The echo light signal pulse 22 is received using the receiver 24. This is shown from above in the second diagram in FIG. 3. The actual reception time 32 is the moment at which the temporally front edge of the echo light signal pulse 22 reaches the receiver 24. The distance d can be calculated from a signal time of flight 34 and the speed of the light signal pulses 20 and 22, specifically the speed of light. The signal time of flight 34 is the time between the emission of the light signal pulse 20 at a transmission time 36 and the reception of the echo light signal pulse 22 at the reception time 32. In the exemplary embodiment shown, the signal time of flight 34, the ascertainment of which will be described further below, is approximately 64 ns.

Figure 3:
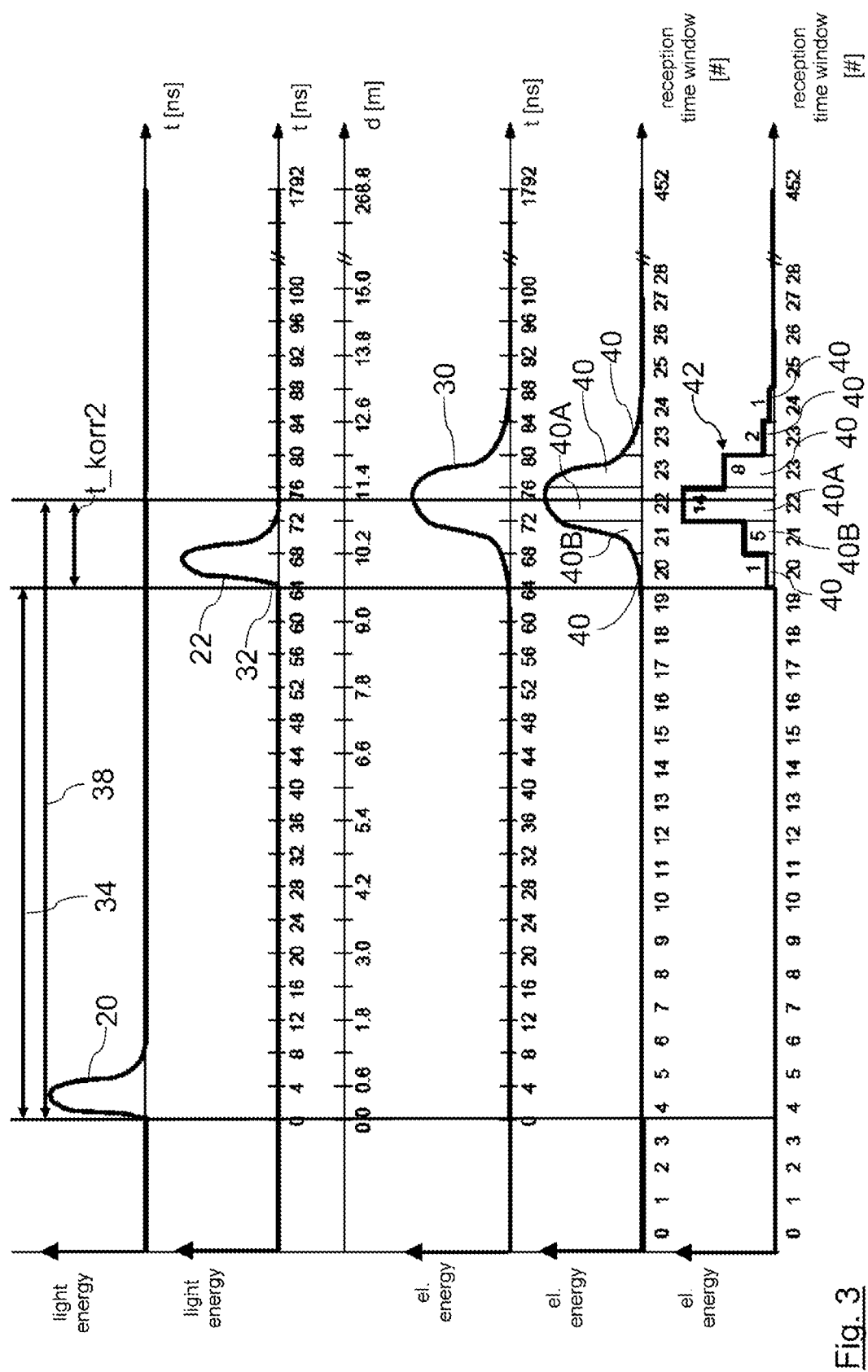
FIG. 3 shows, from the top to the bottom, a temporal profile of the energy of a light signal pulse emitted using a transmitter of the laser scanner from FIGS. 1 and 2, a temporal profile of the energy of the at an object echo light signal pulse received using the receiver of the laser scanner, a temporal profile of electrical energy generated using the receiver from the reflected optical signal pulse; an assignment of the temporal profile of the electrical energy to corresponding reception time windows, the electrical energy per reception time window in the temporal profile.

Using the receiver 24, the received echo light signal pulse 22 is converted into the electrical reception signal 30 and registered, which is shown in FIG. 3 in the 4th to 6th diagrams from the top. The time required for this results in a delay of the registration of the reception of the echo light signal pulse 22 compared to the actual reception time 32. During the registering of the electrical reception signal 30, initially it is thus not the signal time of flight 34 that is determined but rather a total time 38 made up of the signal time of flight 34 and the delay that is required for the conversion.

In order to determine the signal time of flight 34, as will be explained in more detail below, the difference between the total time 38 and a correction time t_korr2, which will be de-noted as second correction time t_korr2 for reasons that will become clear, is ascertained. The second correction time t_korr2 takes into account the time needed to convert the echo light signal pulse 22 into the electrical reception signal 30 and to register the electrical reception signal 30.

From the signal time of flight 34 thus ascertained, the distance d of the object 16 from the laser scanner 12 is calculated. The distance d in the exemplary embodiment is approximately 10 m, as is shown in FIG. 3 in the third diagram from the top.

The ascertainment of the second correction time t_korr2 will be explained in more detail below.

The light energy of the echo light signal pulse 22, which has a continuous temporal profile, is converted into electrical energy using the CCD array of the receiver 24. This results in the electrical reception signal 30 having a continuous profile. In this case, the electrical energy is accumulated according to the temporal profile of the echo light signal pulse 22 in temporally successive reception time windows 40. Each reception time window 40 then contains the electrical energy that corresponds to the energy of the echo light signal pulse 22 minus corresponding conversion losses in the respective reception time window 40.

The echo light signal pulse 20 having a continuous energy profile is thus initially converted into an electrical reception signal with a discrete energy profile, which will be referred to below as the discrete electrical reception signal 42. The exemplary discrete electrical reception signal 42 is shown in FIG. 3 in the sixth diagram from the top.

Figure 4:
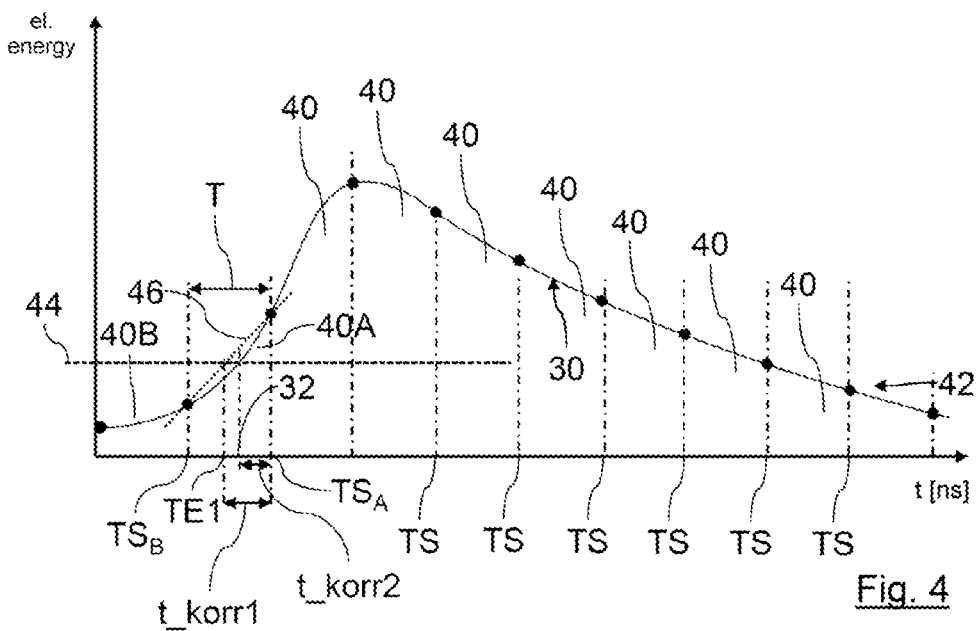
FIG. 4 shows a temporal profile of the electrical energy generated on the basis of the echo light signal pulse, the corresponding reception time windows and correction times for the reception time of the echo light signal pulse proceeding from a sampling time of the first reception time window, in which the electrical energy exceeds a prescribed threshold value.

The temporal length of the reception time windows 40 corresponds to the prescribed cycle time T, in which the change between the reception time windows 40 also takes place. In the exemplary embodiment, the cycle time T=4 ns. The respective temporal end of a reception time window 40 is referred to as the sampling time TS thereof. The sampling time TS refers to the timescale of the respective distance measurements, which begins with the emission of the light signal pulse 20 by the transmitter 18 at time 0 s. FIG. 4 shows the temporal profile of the continuous electrical reception signal 30 and the corresponding reception time windows 40 at their respective cycle times TS with the corresponding electrical energies.

At the end of each reception time window 40, that is to say at the respective sampling time TS, the electrical energy contained therein is compared with a prescribed threshold value 44 shown in FIG. 4. If the electrical energy is greater than the threshold value 44, the corresponding reception time window 40 is used as the first reference reception time window 40A. In FIG. 4, this is, by way of example, the third reception time window 40. The reception time window 40 that temporally precedes the first reference reception time window 40A is used as the second reference reception time window 40B. The electrical energy of the second reference reception time window 40B lies below the threshold value 44. The actual reception time 32 of the echo light signal pulse 22 must consequently lie between the sampling time $TS_B$ of the second reference reception time window 40B and the sampling time $TS_A$ of the first reference reception time window 40A. By way of example, the second sampling time $TS_A$ is corrected to obtain the reception time 32.

A linear interpolation of the temporal profile of the discrete electrical reception signal 42 is initially performed for this purpose between the first reference reception time window 44A and the second reference reception time window 44B. In this case, the reference reception time windows 44A and 44B are in each case characterized by their associated electrical energies and their respective sampling times $TS_A$ and $TS_B$. Accordingly, the electrical energies and the sampling times $TS_A$ and $TS_B$ are used to perform the linear interpolation. The linear interpolation results in a straight section 46 of the curve profile of the discrete electrical reception signal 42.

The time at which the electrical energy of the discrete electrical reception signal 22 in the linearly interpolated section 46 corresponds to the threshold value 44, is ascertained as the first reception time TE1.

Next, a first correction time t_korr1 is ascertained from the difference between the sampling time $TS_A$ of the first reference reception time window 40A and the first reception time TE1. The first correction time t_korr1 is a first approximation. However, it does not take into account the continuous profile of the electrical reception signal 30.

In order to take this into account, a correction function is used to determine the second correction time t_korr2 already mentioned above from the first correction time t_korr1.

Said correction function is $$\text{t\_korr2} = \text{f\_t\_korr1}(x) = T \frac{\int_0^{\text{t\_korr1}} p(x)dx}{\int_0^T p(x)dx}$$

Here, p(x) is the frequency of the occurrence of the first correction time t_korr1 within a reception time window 40 with the length of the cycle time T in the case of a multiplicity of reference measurements with different signal times of flight 34.

Using the correction function f_t_korr1(x), it is possible to ascertain a corresponding second correction time t_korr2 for each first correction time t_korr1 occurring within the cycle time T. It is assumed in this case that, for reference measurements with different distances d of an object 16 from the laser scanner 12, all second correction times t_korr2 occur with the same frequency within the cycle time T. The correction function f_t_korr1(x) takes into account a temporal profile of a corresponding continuous electrical reception signal 30, in which the energy of the received echo light signal pulse 22 is continuously converted into electrical energy and registered.

Figure 5:
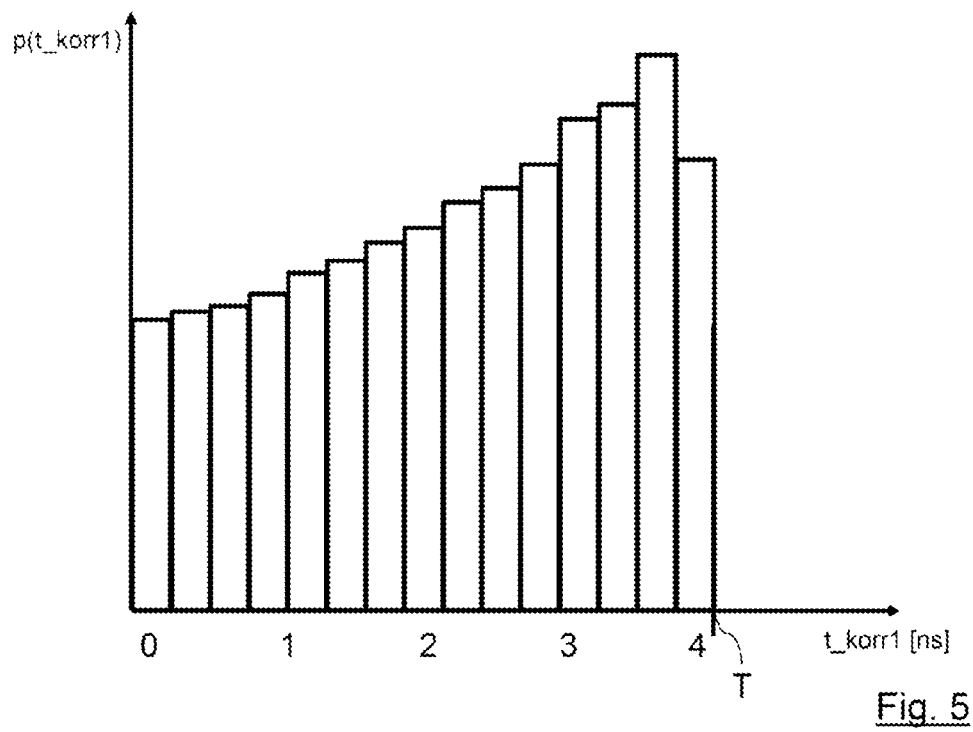
FIG. 5 shows a histogram of a frequency of the occurrence of correction times at reference measurements in the case of objects at different distances.

FIG. 5 shows by way of example a diagram of the frequencies p(t_korr1) of first correction times t_korr1 within the cycle time T for a multiplicity of reference measurements. The correction function f_t_korr1(x) is ascertained initially, for example after the production of the laser scanner 12, and stored in the control and evaluation device 28.

The actual reception time 32 is calculated from the difference between the first sampling time $TS_A$ of the first reference reception time window 40A and the second correction time t_korr2. The signal time of flight 34 is ascertained from the reception time 32. The distance d of the object 16 is ascertained from the signal time of flight 34.

The correction function f_t_korr1(x) can optionally be determined for echo light signal pulses 22 having different amplitudes, that is to say different energies. Influences of the amplitudes on the curve profile of the echo light signal pulse 22 and the corresponding continuous electrical reception signal 30 can be compensated in this way.

The invention claimed is:

1. A method for determining a distance of an object by an optical detection apparatus, the method comprising:
emitting at least one light signal pulse;
receiving at least one echo light signal pulse, wherein the at least one echo light signal pulse is the at least one light signal pulse reflected off of the object;
converting the at least one echo light signal pulse into at least one electrical reception signal, wherein a conversion time is an amount of time used to convert the at least one echo light signal pulse into the at least one electrical reception signal;
recording the at least one electrical reception signal, wherein a recording time is an amount of time used to record the at least one electrical reception signal;
determining a total time between the emitting of the at least one light signal pulse and the recording of the at least one electrical reception signal; and
calculating a signal time of flight between the emitting of the at least one light signal pulse and the receiving of the at least one echo light signal pulse, wherein the signal time of flight is a difference between the total time and at least one correction time,
wherein the at least one correction time comprises the conversion time and the recording time,
wherein the signal time of flight is measured to determine the distance of the object from the optical detection apparatus,
wherein the at least one received echo light signal pulse is divided upon reception into temporally successive discrete reception time windows having a temporal length that corresponds to a predetermined cycle time, and a respective energy of the at least one echo light signal pulse in the corresponding reception time windows is converted into corresponding electrical energy,
wherein an end of the respective conversion is assigned in each case as a sampling time to the corresponding reception time window and the discrete temporal profile of the electrical energy of the mutually successive reception time windows forms the temporal profile of a discrete electrical reception signal,
wherein the electrical energies of the reception time windows are compared in each case with a predetermined threshold value,
wherein calculating the signal time of flight further comprises:
comparing each discrete electrical reception signal with a predetermined threshold value, wherein a first reference reception time window is a reception time window corresponding to the discrete electrical reception signal that is greater than the predetermined threshold value, and a second reference reception time window is the reception time window temporally preceding the first reference reception time window;
performing a linear interpolation of the discrete temporal profile of the discrete electrical reception signal of the first reference reception time window, wherein the linear interpolation begins at the sampling time of the second reference reception time window and ends at the sampling time of the first reference reception time window;
calculating a first reception time, wherein the first reception time corresponds to a time when the discrete electrical reception signal reaches the predetermined threshold value in the linear interpolation;
calculating a first correction time that is the difference between the sampling time of the first reference reception time window and the first reception time;
calculating a second correction time from a correction function for the first correction time, wherein the correction function is based on a temporal profile of a corresponding temporally continuous electrical reception signal; and
calculating the signal time of flight from the difference between the sampling time of the first reference reception time window and the second correction time.

2. The method as claimed in claim 1, wherein the correction function is determined by one or more reference measurements, wherein the one or more reference measurements are measurements comprising different distances of the object from the optical detection apparatus.

3. The method as claimed in claim 1, wherein the correction function is determined initially.

4. The method as claimed in claim 1, wherein the correction function is $$t\_korr2 = f\_t\_korr1(x) = T \frac{\int_0^{t\_korr1} p(x)dx}{\int_0^T p(x)dx},$$

wherein T is a respective length of the reception time window, t_korr1 is the first correction time, t_korr2 is the second correction time, p(x) is a frequency of an occurrence of events with the first correction time within the reception time window for a multiplicity of reference measurements with different signal times of flight.

5. The method as claimed in claim 1, wherein the distance of the object from the optical detection apparatus is calculated from the signal time of flight.

6. The method as claimed in claim 1, wherein respective correction functions are calculated and/or predetermined for light signal pulses and/or electrical reception signals having different amplitudes.

7. The method as claimed in claim 1, wherein the at least one echo light signal pulse is received using at least one charge-coupled semiconductor component and converted into the at least one electrical reception signal.

8. The method as claimed in claim 1, wherein the signal time of flight and the distance are calculated using an electrical control and evaluation device.

9. An optical detection apparatus for determining a distance of an object, comprising:
at least one transmitter for emitting at least one light signal pulse;
at least one receiver for:
receiving the at least one light signal pulse reflected at the object as at least one echo light signal pulse, and
converting the at least one echo light signal pulse into at least one electrical reception signal and for recording the at least one electrical reception signal; and
at least one control and evaluation device configured to carry out a method comprising:
controlling the at least one transmitter and the at least one receiver,
converting the at least one echo light signal pulse into the at least one electrical reception signal, wherein a conversion time is an amount of time used to convert the at least one echo light signal pulse into the at least one electrical reception signal;

recording the at least one electrical reception signal, wherein a recording time is an amount of time used to record the at least one electrical reception signal;

determining a total time of flight between the emitting of the at least one light signal pulse and the recording of the at least one electrical reception signal, and calculating a signal time of flight between the emitting of the at least one light signal pulse and the receiving of the at least one echo light signal pulse, wherein the signal time of flight is a difference between the total time and at least one correction time, wherein the at least one correction time comprises the conversion time and the recording time, wherein the signal time of flight is measured to determine the distance of the object from the optical detection apparatus, wherein the at least one echo light signal pulse is divided into one or more reception time windows having a temporal length that corresponds to a predetermined cycle time such that each of the one or more reception time windows comprises a portion of energy from the at least one echo light signal pulse;

wherein each portion of energy is converted into a discrete electrical reception signal, such that each discrete electrical reception signal corresponds to a discrete temporal profile of the portion of energy for a corresponding reception time window, and wherein a temporal end of each of the one or more reception time windows corresponds to a sampling time; and wherein calculating the signal time of flight further comprises:

comparing each discrete electrical reception signal with a predetermined threshold value, wherein a first reference reception time window is a reception time window corresponding to the discrete electrical reception signal that is greater than the predetermined threshold value, and a second reference reception time window is the reception time window temporally preceding the first reference reception time window;

performing a linear interpolation of the discrete temporal profile of the discrete electrical reception signal of the first reference reception time window, wherein the linear interpolation begins at the sampling time of the second reference reception time window and ends at the sampling time of the first reference reception time window;

calculating a first reception time, wherein the first reception time corresponds to a time when the discrete electrical reception signal reaches the predetermined threshold value in the linear interpolation;

calculating a first correction time that is the difference between the sampling time of the first reference reception time window and the first reception time;

calculating a second correction time from a correction function for the first correction time, wherein the correction function is based on a temporal profile of a corresponding temporally continuous electrical reception signal; and calculating the signal time of flight from the difference between the sampling time of the first reference reception time window and the second correction time.

10. The optical detection apparatus as claimed in claim 9, wherein the at least one receiver has at least one charge-coupled semiconductor component.

11. The optical detection apparatus as claimed in claim 9, wherein the at least one control and evaluation device is configured to determine the distance of the object from the optical detection apparatus using the signal time of flight.

\* \* \* \* \*